(12) United States Patent
Ogasawara et al.

(10) Patent No.: US 8,858,244 B2
(45) Date of Patent: Oct. 14, 2014

(54) BATTERY PACK BUSBAR MODULE

(71) Applicants: Yazaki Corporation, Tokyo (JP); Toyota Jidosha Kabushiki Kaisha, Toyota (JP)

(72) Inventors: Shigeyuki Ogasawara, Kakegawa (JP); Takao Syouji, Kakegawa (JP); Shinichi Yanagihara, Kakegawa (JP); Michio Ota, Kakegawa (JP); Kenji Eto, Toyota (JP)

(73) Assignees: Yazaki Corporation, Tokyo (JP); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 13/750,397

(22) Filed: Jan. 25, 2013

(65) Prior Publication Data
US 2013/0196521 A1 Aug. 1, 2013

(30) Foreign Application Priority Data
Jan. 27, 2012 (JP) ................................. 2012-015261

(51) Int. Cl.
 *H01R 13/44* (2006.01)
 *H01M 2/20* (2006.01)
 *H01M 2/34* (2006.01)

(52) U.S. Cl.
 CPC ............... *H01M 2/34* (2013.01); *H01M 2/206* (2013.01); *Y02E 60/12* (2013.01)
 USPC ......................................... 439/135; 439/500

(58) Field of Classification Search
 CPC ..... H01M 2/30; Y02E 60/12; H01R 13/2442; H01R 13/282; H01R 13/447; H01R 13/6275; H01R 43/24
 USPC .......... 429/121, 122, 151, 170; 439/135, 350, 439/353, 357, 388, 500, 736
 See application file for complete search history.

(56) References Cited

U.S. PATENT DOCUMENTS

| | | | | |
|---|---|---|---|---|
| 4,455,356 | A * | 6/1984 | Barrett, Jr. ...................... | 429/66 |
| 4,983,473 | A * | 1/1991 | Smith .............................. | 429/48 |
| 5,413,499 | A * | 5/1995 | Wright et al. .................. | 439/500 |
| 6,290,552 | B1 | 9/2001 | Saito et al. | |
| 6,346,011 | B1 * | 2/2002 | Ikeda ............................. | 439/627 |
| 6,544,077 | B2 * | 4/2003 | Ikeda ............................. | 439/736 |
| 6,935,020 | B2 * | 8/2005 | Ikeda ............................. | 29/854 |
| 7,601,457 | B2 * | 10/2009 | Byun et al. ..................... | 429/121 |

(Continued)

FOREIGN PATENT DOCUMENTS

JP  2000-333343  A  11/2000

*Primary Examiner* — Thanh Tam Le
(74) *Attorney, Agent, or Firm* — Sughrue Mion, PLLC

(57) ABSTRACT

Abnormal noise at a battery pack busbar module is prevented. A battery pack busbar module includes busbar accommodating portions each accommodate busbars which connect in series batteries, cover portions coupled by hinges to one of side edges of openings in the busbar accommodating portions to cover the openings, and lock portions to lock the cover portions by bringing first engagement portions provided on the other side edges of the busbar accommodating portions and second engagement portions provided on the cover portions into engagement with each other, and ribs projecting from the cover portions to come into abutment with the busbar accommodating portions are formed in positions spaced away from the lock portions, a height of the ribs being set such that the second engagement portions are not brought into engagement with the first engagement portions when the ribs abut the busbar accommodating portions.

4 Claims, 6 Drawing Sheets

(56) References Cited

U.S. PATENT DOCUMENTS

| | | | |
|---|---|---|---|
| 7,614,906 B2 * | 11/2009 | Kim et al. | 439/500 |
| 8,492,024 B2 * | 7/2013 | Ogasawara et al. | 429/170 |
| 2001/0039150 A1 | 11/2001 | Saito et al. | |
| 2001/0044241 A1 | 11/2001 | Saito et al. | |
| 2001/0046816 A1 | 11/2001 | Saito et al. | |

* cited by examiner

BATTERY PACK BUSBAR MODULE

BACKGROUND OF THE INVENTION

The present invention relates to a battery pack busbar module and more particularly to a technique of preventing the occurrence of abnormal noise at a joint portion between a resin busbar accommodating portion which accommodates a plurality of busbars which connect a plurality of batteries in series and a resin cover portion which covers an opening in the busbar accommodating portion.

A battery pack (a battery set or battery unit) in which a plurality of batteries are connected in series is used as a direct current power supply for driving a motor installed in an electric vehicle or hybrid vehicle. As described in Patent Literature 1, a battery pack like this is formed as a battery assembly in which a plurality of batteries are arranged to be bundled together in such a way that positive electrodes and negative electrodes of adjacent batteries are aligned alternately and are connected to each other in series by connecting the positive electrode and the negative electrode of the adjacent batteries with a conductor called a busbar. Then, the battery assembly or pack so formed is accommodated in a casing as required for use. In addition, the busbars which connect the batteries making up the battery pack together in series are accommodated in a box-shaped busbar accommodating portion which is made of an insulating resin material for installation in the battery pack. Then, in order to protect the busbars which are exposed from an opening side of the box-shaped busbar accommodating portion, a busbar module is used in which a resin cover portion is hinged to one of side edges of the box-shaped busbar accommodating portion which extend in a direction in which the batteries are connected together in series so as to be opened and closed.

As described in Patent Literature 1 or as the related art in the same literature, the cover portion is a resin plate-shaped member which is hinged to one of the side edges of the opening in the busbar accommodating portion which extend in the direction in which the batteries are arranged so as to cover the opening in the busbar accommodating portion. Additionally, in order to lock the cover portion to the busbar accommodating portion in such a state that the cover portion covers the opening in the busbar accommodating portion, a lock portion is provided. The lock portion is made up of a first engagement portion and a second engagement portion. The first engagement portion is provided on the other side edge of the opening in the busbar accommodating portion which extends in the direction in which the batteries are arranged. The second engagement portion is provided on the cover portion so as to correspond in position to the first engagement portion. Then, in this lock portion, by bringing the first engagement portion and the second engagement portion into engagement with each other, the cover portion is allowed to be locked to the busbar accommodating portion in such a state that the cover portion covers the opening in the busbar accommodating portion.

Patent Literature 1 JP-A-2000-333343

However, in the busbar module described in Patent Literature 1 above, nothing is taken into consideration to prevent a risk of abnormal noise occurring at the joint portion between the cover portion and the busbar accommodating portion when external vibrations are imparted to the busbar module which is installed in the battery pack mounded in a vehicle such as a motor vehicle.

SUMMARY

A problem that the invention is to solve is how to prevent a risk of abnormal noise occurring at a joint portion between a busbar accommodating portion and a cover portion of a battery pack busbar module.

According to one aspect of the embodiments of the present invention, there is provided a battery pack busbar module comprising a resin busbar accommodating portion having an opening in which a plurality of busbars which connect in series a plurality of batteries which are arranged so that positive electrodes and negative electrodes are aligned alternately are accommodated, a resin cover portion which is hinge coupled to one of side edges of the opening in the busbar accommodating portion which extend in a direction in which the batteries are arranged so as to cover the opening in the busbar accommodating portion in an opening and closing fashion and a lock portion having a first engagement portion which is provided on the other side edge of the opening in the busbar accommodating portion which extends in the direction in which the batteries are arranged and a second engagement portion which is provided on the cover portion so as to correspond to the first engagement portion and configured to lock the cover portion in a position where the cover portion covers the opening in the busbar accommodating portion by bringing the first engagement portion and the second engagement portion into engagement with each other, wherein a rib which is caused to project from the cover portion towards the busbar accommodating portion to be brought into abutment with the busbar accommodating portion is formed in a position which is spaced away from the lock portion in the direction in which the batteries are arranged, and a projecting height of the rib is set to a height at which the second engagement portion on the cover portion is not brought into engagement with the first engagement portion on the busbar accommodating portion in such a position that the rib is brought into abutment with the busbar accommodating portion.

By configuring the battery pack busbar module in the way described above, in locking the first and second engagement portions together, when a pressing force is applied between the cover portion and the busbar accommodating portion so that the cover portion closes the opening in the busbar accommodating portion, firstly, the rib which is caused to project from the cover portion is brought into abutment with the busbar accommodating portion. When the pressing force is increased further, the cover portion is deflected about the rib as a fulcrum through elastic deformation thereof, and the lock portion is locked in the position where the cover portion is deflected to the position where the second engagement portion of the cover portion is locked on the first engagement portion on the busbar accommodating portion. The pressing force is applied to the abutment portion between the rib and the busbar accommodating portion according to the elastic deformation of the cover portion in such a state that the lock portion is locked, whereby the cover portion is brought into abutment with the busbar accommodating portions strongly and rigidly. By this strong and rigid abutment of the cover portion with the busbar accommodating portion, a gap is ensured between the busbar accommodating portion and the cover portion by the rib even when vibrations are imparted to the busbar module from the outside. Therefore, it is possible to prevent the occurrence of abnormal noise which would otherwise be caused by the repeated contact and separation of the busbar accommodating portion and the cover portion. Additionally, the rib is formed in the position which is spaced away from the lock portion in the direction in which the batteries are arranged, and therefore, the cover portion can be deflected with a relatively small pressing force, thereby making it possible to improve the easy performance of closing operation of the cover portion.

In this case, the cover portion is formed into a box shape having side walls which are suspended towards the busbar accommodating portion in appropriate positions on a side edge of a plate member which is shaped so as to cover the opening in the busbar accommodating portion. Then, it is preferable that a rib which is brought into abutment with the busbar accommodating portion is formed at a lower end of a side wall and a second engagement portion of the lock portion is formed on a side wall which is spaced away from the side wall where the rib is formed in the direction in which the batteries are arranged. According to this configuration, the elastic force of the cover portion can be made large, and therefore, the capability to prevent the occurrence of abnormal noise can be increased.

In addition, the elastic force acting on the lock portion is dependent upon the elastic force of the cover portion, and therefore, the height of the rib can be set based on at least either of a dimension over which the lock portion is spaced away from the rib and the elasticity of the cover portion.

DETAILED DESCRIPTION OF EMBODIMENTS

Figure 6:
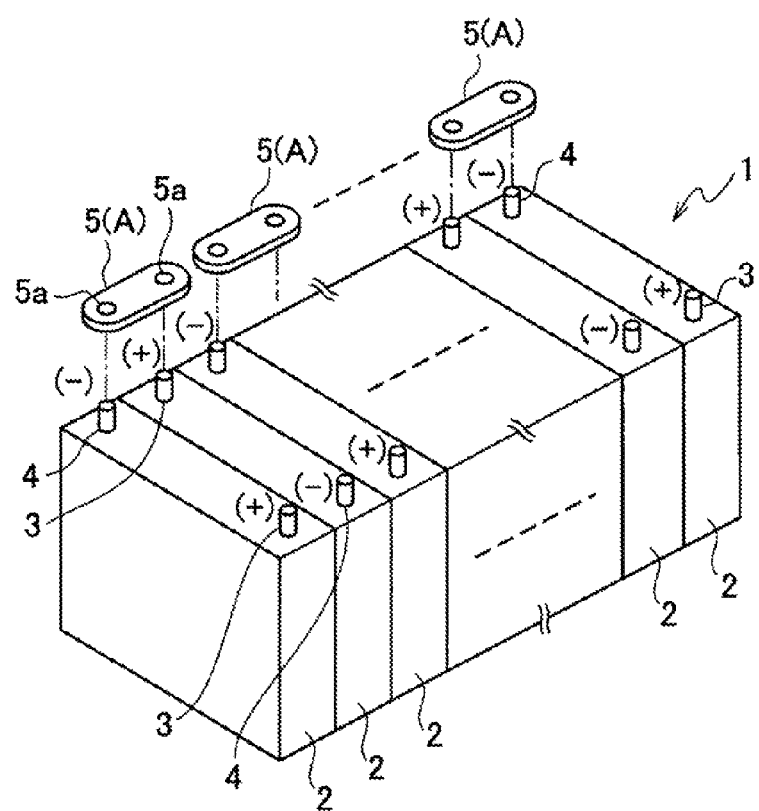
FIG. 6 is a perspective view of a battery pack to which the busbar module of the invention is applied.

A busbar module of an embodiment of the invention will be described by reference to FIGS. 1 to 6. The busbar module of the embodiment will be described as being applied to an example of a battery pack shown in FIG. 6. As shown in FIG. 6, a battery pack 1 used as a direct current power supply for driving a motor installed in an electric vehicle or hybrid vehicle is formed by arranging to bundle up with a binding member a plurality of batteries 2 in such a way that positive (+) electrodes 3 and negative (−) electrodes 4 of the batteries 2 lying adjacent to each other are aligned alternately and connecting electrically those batteries 2 in series. For example, the battery pack 1 is formed by arranging a number of batteries 2 corresponding to a required direct voltage in a thickness direction while connecting them in series. In the example shown in FIG. 6, electrodes 3, 4 of each battery 2 are pillar-shaped electrodes which project from an upper portion thereof. A positive electrode 3 of a battery 2 which is disposed at one end and a negative electrode 4 of a battery 2 which is disposed at the other end of the battery pack 1 are made into general electrodes of the battery pack 1. Positive electrodes 3 and negative electrodes 4, which are cylindrical electrodes, of batteries 2 which are sandwiched by the batteries 2 at both the ends of the battery pack 1 are connected in series by busbars 5, which are conductors, whereby the battery pack 1 is formed.

The plurality of busbars 5 used in the battery pack 1 are divided into two groups A, B according to the sides of the battery pack 1 where the electrodes which are provided at both ends of the batteries 2 along a direction in which the battery pack 1 is arranged reside, and the busbars of the individual groups are accommodated in recess portions, not shown, which are formed in resin busbar accommodating portions 6A, 6B and are then held by locking projections. The busbar accommodating portions 6A, 6B are each formed into a box shape so as to accommodate the pillar-shaped electrodes therein. Namely, holes through which the pillar-shaped electrodes of the batteries 2 can be inserted are formed in bottom plates of the busbar accommodating portions 6A, 6B. Then, a pair of pillar-shaped electrodes which are the positive electrode 3 and the negative electrode 4 of the adjacent batteries 2 are inserted through a pair of holes 5a formed in the busbar 5. Following this, nuts are screwed on the pillar-shaped electrodes via screw threads which are formed on outer circumferential surfaces of the pillar-shaped electrodes, whereby the busbar 5 is electrically connected to the pillar-shaped electrodes.

Here, by reference to FIGS. 1 to 5, a detailed configuration of a busbar module 8 will be described. The busbar module 8 constitutes a characteristic part of this embodiment and is made up of the busbar accommodating portions 6A, 6B and cover portions 7A, 7B. Since the busbar accommodating portion 6A and the cover portion 7A are basically formed in a similar fashion to the busbar accommodating portion 6B and the cover portion 7B, for the sake of a simple description, only the busbar accommodating portion 6A and the cover portion 7A will be described in detail, while the busbar accommodating portion 6B and the cover portion 7B will be described mainly on what they differ from the busbar accommodating portion 6A and the cover portion 7A.

Figure 1:
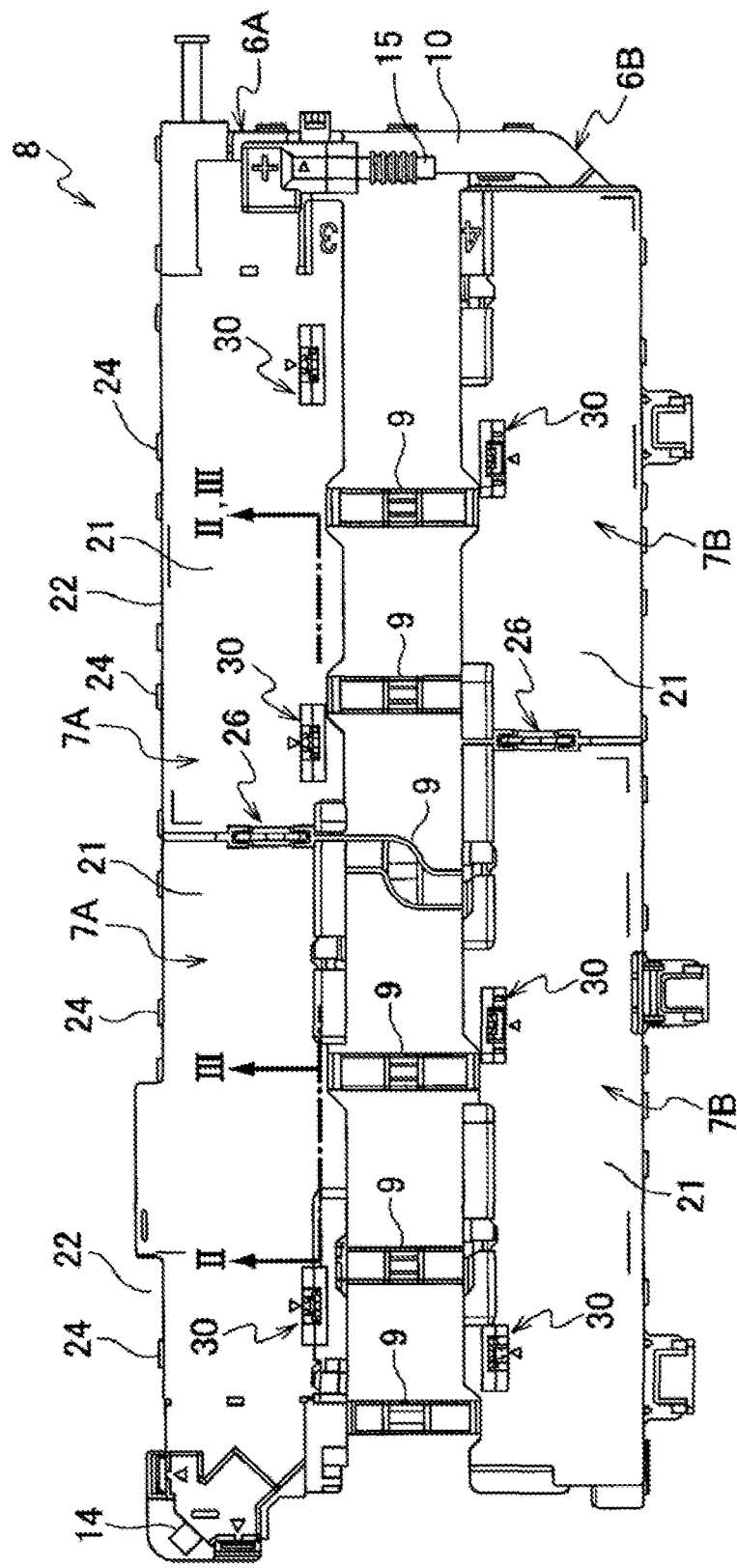
FIG. 1 is a plan view of a busbar module of an embodiment of the invention.
Figure 2:
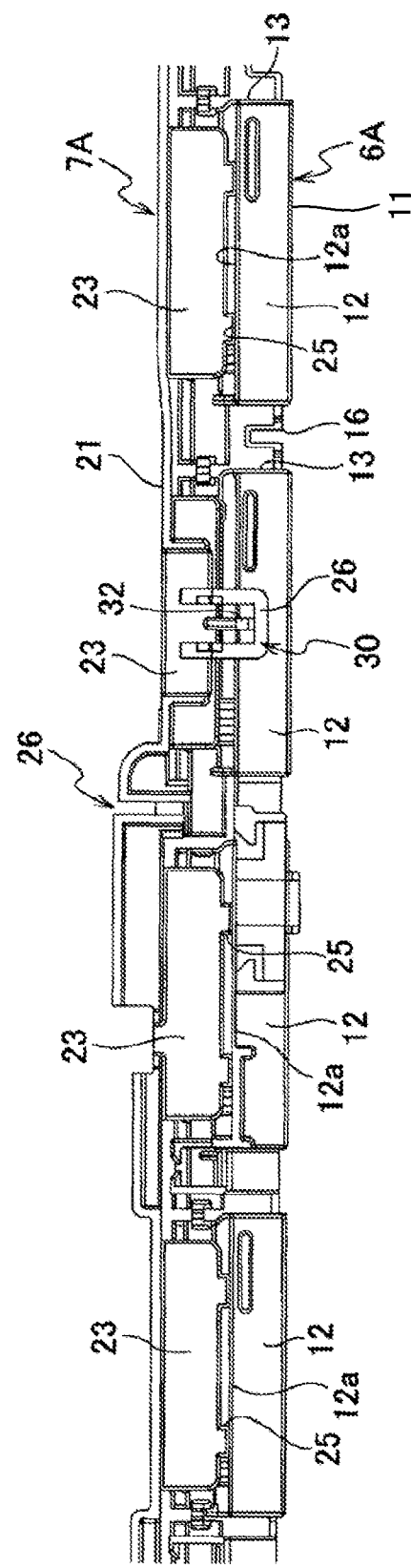
FIG. 2 is a sectional view of the busbar module shown in FIG. 1 taken along the line II-II and viewed in a direction indicated by arrows attached to the line.

As shown in FIGS. 1 and 2, the busbar accommodating portion 6A has a plurality of coupling members 9 and a wiring member 10 so as to be integrated with the busbar accommodating portion 6B. The busbar accommodating portion 6A is formed of a resin into a box shape and has a bottom plate 11 which is placed on an upper surface of the battery pack 1, side walls 12 which rise upright individually from longitudinal side edges of the bottom plate 11 which extend in a direction in which the batteries are arranged and side walls 13 which rise upright individually from transverse side edges of the bottom plate 11. A recess portion is formed in the bottom plate 11 for accommodating the plurality of busbars 5 which connect in series the positive electrodes 3 and the negative electrodes 4 of the batteries 2 which are aligned adjacent to each other. In addition, an output terminal 14 is provided at a left end of the busbar accommodating portion 6A in FIG. 1 for connection to the general negative electrode 4 of the battery pack 1, while an output terminal 15 is provided at a right end of the busbar accommodating portion 6A in FIG. 1 for connection with the general positive electrode 3 of the battery pack 1. The output terminal 15 is electrically connected to the positive electrode 3 of the battery 2 positioned at a right end of the busbar module 8.

The cover portion 7A is formed integrally with the busbar accommodating portion 6A. The cover portion 7A is formed into a box shape and has a plate member 21 which is shaped so as to cover an opening in the busbar accommodating portion 6A and side walls 22, 23 which are suspended towards the busbar accommodating portion 6A. In addition, a lower end of the side wall 22 which is formed along one of side edges of the plate member 21 which extend in the direction in which the batteries are arranged is connected to the busbar accommodating portion 6A via hinges 24. By adopting this configuration, the cover portion 7A is allowed to rotate so as to open and close the opening in the busbar accommodating portion 6A. Further, ribs 25 are formed at a lower end of the side wall 23 which is formed along the other side edge of the plate member 21 which extends in the direction in which the batteries are arranged so as to be brought into abutment with an upper surface 12a of the side wall 12 of the busbar accommodating portion 6A. By adopting this configuration, gaps are formed between the lower end of the side wall 23 of the cover portion 7A and the busbar accommodating portion 6A along the full length of the cover portion 7A and the busbar accommodating portion 6A excluding portions where the ribs 25 are formed. Further, second engagement portions which make up lock portions 30 are provided on the side walls 23 which are spaced away from the positions where the ribs 25 are formed in the direction in which the batteries are arranged.

Figure 3:
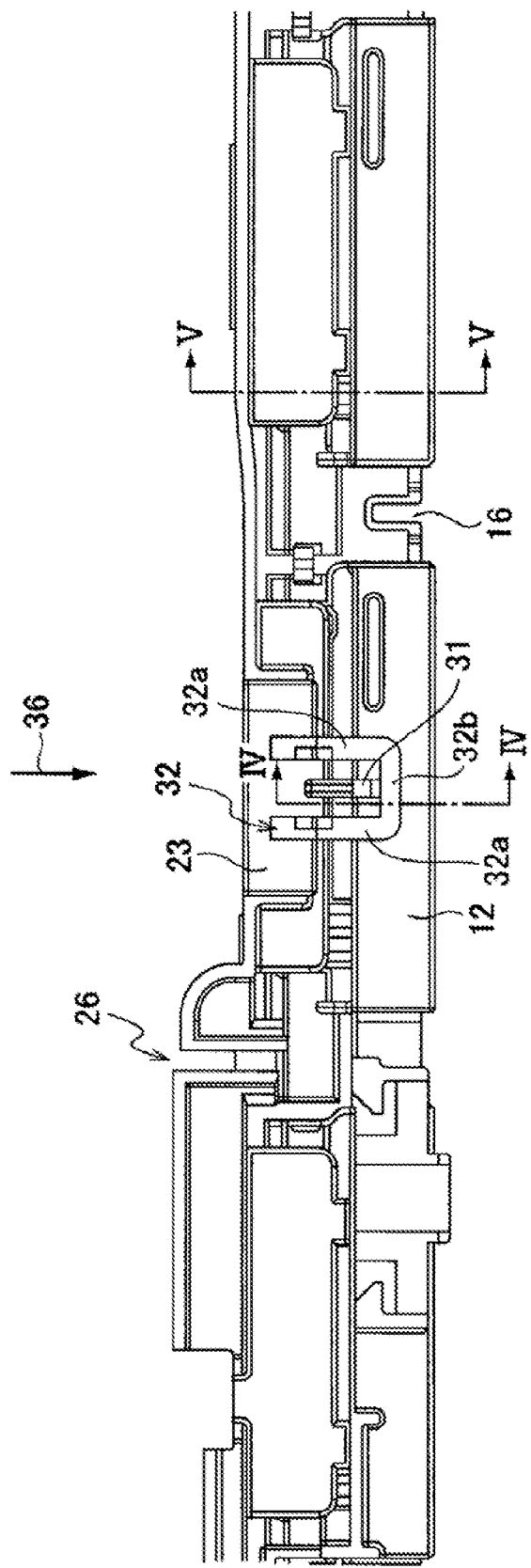
FIG. 3 is a sectional view of the busbar module shown in FIG. 1 taken along the line III-III and viewed in a direction indicated by arrows attached to the line.
Figure 4:
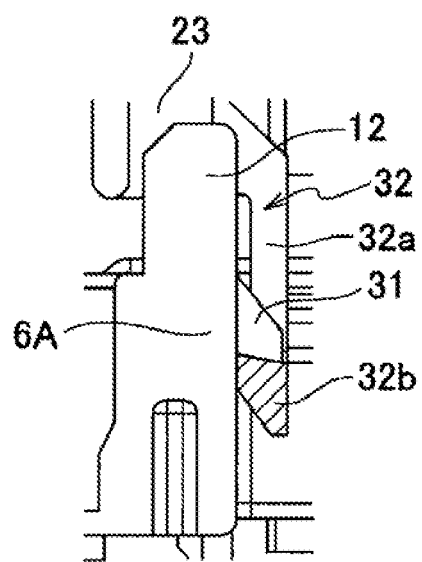
FIG. 4 is an enlarged view of a lock portion of the embodiment shown in FIG. 1 taken along the line IV-IV in FIG. 3.
Figure 5:
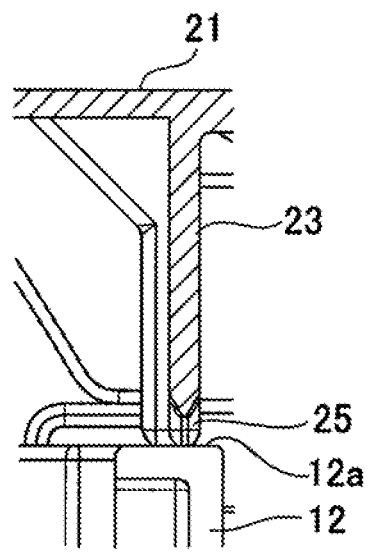
FIG. 5 is an enlarged view of a rib of the embodiment shown in FIG. 1 taken along the line V-V in FIG. 3.

The lock portion 30 is formed so as to lock the cover portion 7A in a position where the cover portion 7A covers the opening in the busbar accommodating portion 6A. Namely, as shown in FIG. 3, the lock portion 30 has a triangular projection 31 which is a first engagement portion provided on the side wall 12 of the busbar accommodating portion 6A and a portal engagement portion 32 which makes up the second engagement portion which is provided on the side wall 23 of the cover portion 7A so as to correspond to the projection 31. Namely, as shown in a sectional view of the lock portion 30 in FIG. 4, the projection 31 is provided on the side wall 12 of the busbar accommodating portion 6A. The projection 31 has a triangular section in which a projecting height is increased from an upper portion towards a lower portion thereof. On the other hand, the engagement portion 32 has a portal shape in which a pair of leg portions 32a which are fixed to the side wall 23 of the cover portion 7A and a beam portion 32b which is formed so as to extend between lower ends of the pair of leg portions 32a. It should be noted that the configuration of the lock portion 30 is not limited to the configuration of this embodiment, provided that the lock portion 30 has any construction in which a projection and a recess portion are brought into engagement with each other by making use of an elastic force so as to lock the busbar accommodating portion 6A and the cover portion 7A together for closure of the opening in the busbar accommodating portion 6A.

Additionally, in this embodiment, the busbar accommodating portion 6A and the cover portion 7A are each divided into two blocks in the direction in which the batteries are arranged. Two blocks of the busbar accommodating portion 6A are coupled together via a flexible coupling member 16 which can extend and contract in the direction in which the batteries are arranged. Additionally, two blocks of the cover portion 7A are coupled together via a coupling member 26 which is allowed to slide only in the direction in which the batteries are arranged. The coupling member 16 of the busbar accommodating portion 6A and the coupling member 26 of the cover portion 7A are disposed in such a way that they are offset from each other by one block in the direction in which the batteries are arranged.

Here, a relation will be described between the height of the rib 25, which relates to a characteristic part of this embodiment, and a locking position of the beam portion 32b of the portal engagement portion 32 on the projection 31 of the lock portion 30. Firstly, when the cover portion 7A is rotated in a direction in which the cover portion 7A closes the opening in the busbar accommodating portion 6A (in a direction indicated by an arrow 36 in FIG. 3), the ribs 25 come into abutment with the upper surface 12a of the side wall of the busbar accommodating portion 6A. As this occurs, an upper surface of the beam portion 32b of the lock portion 30 is positioned above a position where a lower surface of the triangular projection 31 is situated, and therefore, the lock portion 30 is not locked. Following this, when an upper surface of the plate member 21 of the cover portion 7A which is situated at the lock portion 30 is pressed further downwards in the direction indicated by the arrow 36 in FIG. 3, the cover portion 7A is deflected about the rib 25s as fulcrums, and an upper surface of the beam portion 32b is pressed further downwards than the lower surface of the triangular projection 31. In this process, the portal engagement portion 32 is elastically deformed and rides over the projection 31. Thereafter, the upper surface of the beam portion 32b enters on a lower surface side of the projection 31 by virtue of an elastic force, and the beam portion 32b is locked on the lower surface side of the projection 31, whereby the lock portion 30 is locked. By the lock portion 30 being so locked, the ribs 25 are strongly and rigidly pressed against the upper surface 12a of the side walls 12 of the busbar accommodating portion 6A according to the deflection amount of the cover portion 7A. As a result, even when vibrations are applied to the busbar module 8 from the outside, since the ribs 25 are strongly and rigidly pressed against the busbar accommodating portion 6A, the gaps between the busbar accommodating portion 6A and the side wall 23 of the cover portion 7A are secured, thereby making it possible to prevent the occurrence of abnormal noise which would otherwise be caused by the repeated contact and separation of the busbar accommodating portion 6A and the cover portion 7A.

Namely, this embodiment is characterized in that the projecting height of the ribs 25 is set so that the portal engagement portion 32 which is the second engagement portion on the cover portion 7A is not locked on the triangular projection 31 which is the first engagement portion on the cover accommodating portion 6A when the ribs 25 are positioned to come into abutment with the busbar accommodating portion 6A. By adopting this characterized configuration, when a pressing force is applied between the cover portion 7A and the busbar accommodating portion 6A so that the opening in the busbar accommodating portion 6A is closed by the cover portion 7A in locking the engagement portion 32 on the projection 31, firstly, the ribs 25 which are provided on the cover portion 7A so as to project therefrom come into abutment with the busbar accommodating portion 6A. When the pressing force is increased further, the cover portion 7A is deflected about the ribs 25 as fulcrums through elastic deformation, whereby the lock portion 30 is locked in the position where the cover portion 7A is deflected to such a position that the engagement portion 32 on the cover portion 7A is locked on the projection 31 on the busbar accommodating portion 6A. Stress according to the elastic deformation of the cover portion 7A in such a state that the lock portion 30 is locked is applied to the abutment portion between the ribs 25 and the busbar accommodating portion 6A, whereby the cover portion 7A is pressed strongly and rigidly against the busbar accommodating portion 6A. Thus, even when vibrations are imparted to the busbar module 8 from the outside, the ribs 25 are pressed strongly and rigidly against the busbar accommodating portion 6A, whereby the gaps between the busbar accommodating portion 6A and the cover portion 7A are secured, thereby making it possible to prevent the occurrence of abnormal noise which would otherwise be caused by the repeated contact and separation of the busbar accommodating portion 6A and the cover portion 7A. Additionally, the ribs 25 are formed in the positions which are spaced away from the lock portions 30 in the direction in which the batteries are arranged, and therefore, the cover portion 7A can be deflected with a relatively small pressing force, thereby making it possible to improve the easy performance of closing operation of the cover portion 7A.

In addition, according to the embodiment, the cover portion 7A is formed into the box shape and has the plate member 21 which is shaped so as to cover the opening in the busbar accommodating portion 6A and the side walls 22, 23 which are suspended towards the busbar accommodating portion 6A. Additionally, the portal engagement portion 32 which makes up the lock portion 30 and the ribs 25 are formed on the side wall 23. Therefore, the elastic force of the cover portion 7A can be made large, thereby making it possible to increase the capability to prevent the occurrence of abnormal noise.

Additionally, the elastic force acting on the lock portion 30 is dependent upon the elastic force of the cover portion 7A, and therefore, the height of the ribs 25 is preferably set based upon at least either of a dimension over which the lock portion 3 is spaced away from the rib 25 and the elasticity of the cover portion 7A.

According to the invention, it is possible to prevent the occurrence of abnormal noise between the busbar accommodating portion and the cover portion of the battery pack busbar module.

What is claimed is:

1. A battery pack busbar module comprising:
   a resin busbar accommodating portion having an opening containing therein a plurality of busbars connected in series with a plurality of batteries arranged so that electrodes of each of the batteries having different polarities are disposed adjacent to each other;
   a resin cover portion coupled to one of a plurality of side edges of the opening in the busbar accommodating portion via a plurality of hinges, the side edges extending in an array direction of the batteries so as to cover the opening in the busbar accommodating portion in an opening and a closing fashion and;
   a lock portion having a first engagement portion provided on another side edge of the opening in the busbar accommodating portion extending in the array direction of the batteries;
   a second engagement portion provided on the cover portion so as to correspond to the first engagement portion and configured to lock the cover portion in a position where the cover portion covers the opening in the busbar accommodating portion by bringing the first engagement portion and the second engagement portion into engagement with each other, and;
   a rib projecting from the cover portion towards the busbar accommodating portion and configured to be brought into abutment with the busbar accommodating portion, wherein the rib is disposed in a position away from the lock portion in the array direction of the batteries, and having a projecting height set to a height such that the second engagement portion on the cover portion is not brought into engagement with the first engagement portion on the busbar accommodating portion and positioned such that the rib abuts the busbar accommodating portion.

2. The battery pack busbar module according to claim 1, wherein
   the cover portion is formed into a box shape having a recess in a side thereof facing the busbar accommodating portion, and the lock portion and the rib are formed on a side wall of the box shape.

3. The battery pack busbar module according to claim 1, wherein
   the height of the rib is set based on at least either of a dimension over which the lock portion and the rib are spaced away from each other and an elasticity of the cover portion.

4. The battery pack busbar module according to claim 2, wherein
   the height of the rib is set based on at least either of a dimension over which the lock portion and the rib are spaced away from each other and an elasticity of the cover portion.

* * * * *